United States Patent [19]

Boring

[11] Patent Number: 4,781,572
[45] Date of Patent: Nov. 1, 1988

[54] SELF-REGULATING GATE VALVE ASSEMBLY FOR INJECTION MOLDING APPARATUS

[75] Inventor: David E. Boring, New Oxford, Pa.

[73] Assignee: Sonoco Products Company, Hartsville, S.C.

[21] Appl. No.: 107,667

[22] Filed: Oct. 9, 1987

[51] Int. Cl.$^4$ .............................................. B29C 45/20
[52] U.S. Cl. ................................... 425/564; 264/537; 264/328.9; 264/328.12; 425/566
[58] Field of Search ................ 264/537, 328.9, 328.12; 425/562, 563, 564, 565, 566, 577

[56] References Cited

U.S. PATENT DOCUMENTS

| | | | |
|---|---|---|---|
| 884,746 | 4/1908 | MacKenzie | 425/562 |
| 3,010,156 | 11/1961 | Smith | 425/146 |
| 3,070,126 | 12/1962 | Schneider | 425/405 R |
| 3,590,439 | 7/1971 | Swanson | 425/564 |
| 3,871,805 | 3/1975 | Jacobs | 425/550 |
| 3,933,312 | 1/1976 | Fries | 425/564 |
| 4,171,941 | 10/1979 | Yotsutsuji et al. | 425/563 |
| 4,285,661 | 8/1981 | Yotsutsuji et al. | 425/563 |
| 4,289,468 | 9/1981 | von Holdt | 425/566 |
| 4,333,608 | 6/1982 | Hendry | 425/563 |
| 4,380,422 | 4/1983 | Von Holdt | 425/562 |
| 4,468,191 | 8/1984 | Gellert | 425/564 |

Primary Examiner—Jay H. Woo
Assistant Examiner—Timothy W. Heitbrink
Attorney, Agent, or Firm—Bell, Seltzer, Park & Gibson

[57] ABSTRACT

A self-regulating gate valve assembly, adapted for use in a plastic product injection molding apparatus having a mold cavity and a core therein for molding a hollow product of predetermined design, is characterized by a construction substantially eliminating core deflection during plastic molding compound flow in the injection molding apparatus and thus uneven wall thicknesses and weld lines in the hollow molded plastic product. The gate valve assembly includes a valve pin of unique construction for creating a sheath-like flow configuration of the plastic molding compound as it is injected into the mold cavity to produce balanced forces on the mold core to prevent deflection and for closing the gate in a self-regulating manner when the mold cavity is filled.

4 Claims, 3 Drawing Sheets

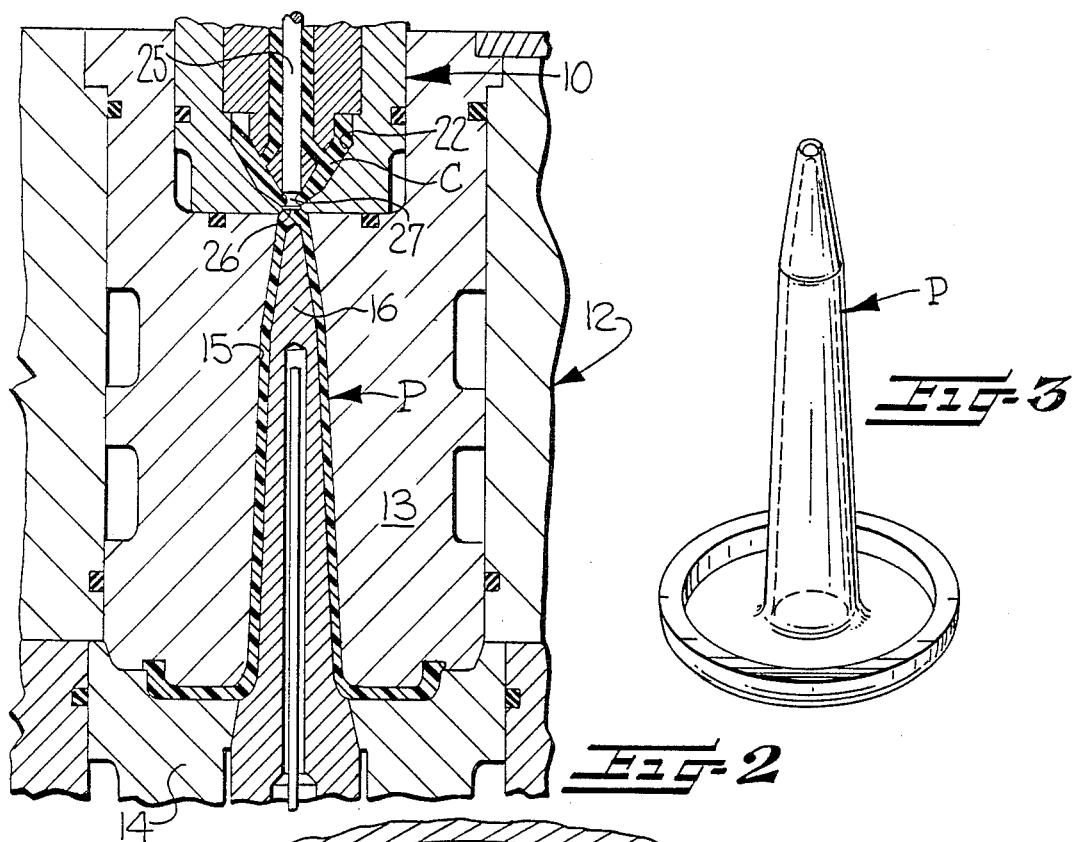
Fig-2
Fig-3
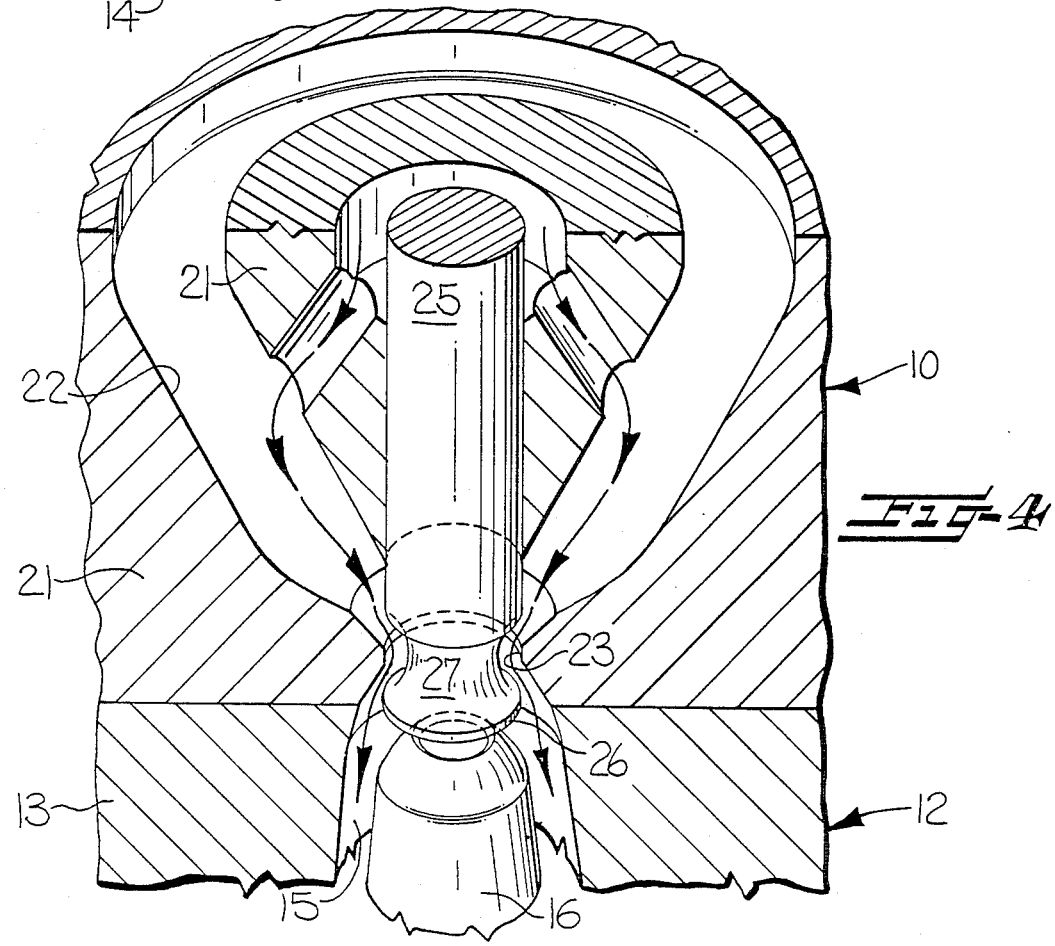
Fig-4

SELF-REGULATING GATE VALVE ASSEMBLY FOR INJECTION MOLDING APPARATUS

FIELD OF THE INVENTION

This invention relates to a self-regulating gate valve assembly, adapted for use in a plastic product injection molding apparatus having a mold cavity and a core therein for molding a hollow product of predetermined design, which is characterized by a construction substantially eliminating core deflection during plastic molding compound flow in the injection molding apparatus and thus uneven wall thicknesses and weld lines in the hollow molded plastic product.

BACKGROUND OF THE INVENTION

In injection molding apparatus of the type having a mold cavity and a core therein for molding of hollow plastic products of predetermined design, such as for example spouts for caulking cartridges, it is customary to utilize a gate valve assembly, positioned between mechanisms for supplying plastic molding compound under pressure from a source and the mold cavity, for monitoring and controlling the flow of plastic molding compound. These gate valve assemblies normally include a valve housing having passageways therein for receiving the plastic molding compound under pressure from the supply mechanisms and a gate of restricted dimensions at the bottom of the housing which communicates with the top of the mold cavity for injecting a jet of the plastic molding compound under a predetermined pressure into the mold cavity to impinge upon the upper end of the mold core and flow around the mold core therein to fill the cavity.

The gate of the gate valve assembly and the core within the mold housing cavity are usually aligned and the core is usually aligned in the center of the mold cavity so that desirably the jet of plastic molding compound injected by the gate of the valve assembly into the mold cavity will impinge upon the end of the core in such a manner as to result in an even distribution of the plastic molding compound around the core to flow symmetrically into the space around the entire length of the core to the bottom of the mold cavity.

However, in view of the high pressure of the jet of plastic molding compound injected from the gate of the valve assembly against the upper end of the core, the core will often be deflected out of alignment with the gate and within the mold cavity resulting in the flow of the molding compound on one side of the core to lead the flow of the molding compound on the other side of the core. This uneven flow of the plastic molding compound and deflection of the core produces uneven thicknesses in the wall of the hollow molded plastic product being formed and, more seriously, produces weld lines where two flow fronts of the plastic molding compound meet each other during filling of the mold cavity. These resulting weld lines produce weak areas in the resulting molded plastic product and thus product failure under many conditions of use.

In an effort to overcome these problems of core deflection resulting in uneven wall thicknesses and weld lines in the resulting molded plastic product, it has heretofore been proposed to utilize a gate valve assembly of the type in which the gate of restricted dimensions is widened by the use of a generally cylindrical gate and valve pin for opening and closing of the gate when flow of the plastic molding compound is desired for filling the mold cavity and when the flow of the plastic molding compound should be shut off after the mold cavity is filled. As a result of these widened or increased dimension gates, which are possible by the use of cylindrical gates and valve pins, a lower pressure jet of plastic molding compound is injected into the mold cavity to impinge upon the upper end of the mold core. However, even such reduction in pressure of the plastic molding compound being injected through the valve assembly gate does not always overcome the core deflection problem and thus uneven wall thicknesses and weld lines in the molded plastic product, particularly when the top of the core against which the plastic molding compound is being injected is relatively small or pointed, such as the case with a caulking cartridge spout, because uneven deflection forces are still produced by the impinging jet of plastic molding compound if any slight misalignment is present.

Moreover, the previously proposed gate valve assemblies utilizing a cylindrical gate and valve pin for reducing the pressure of the plastic molding compound jet have required a complicated control system for opening and closing of the gate of the valve assembly by raising the gate valve pin to open the gate and lowering the gate valve pin to close the gate. Although solutions to this problem of having an expensive and complicated control system for the gate valve pin have been proposed, such as suggested in prior U.S. Pat. No. 4,289,468 which provides a "self-regulating" gate valve using a specially designed gate vale pin, such specially designed gate valve pin enhances core deflection by injecting a jet of plastic molding compound which produces uneven forces on each side of the top of the core in the mold cavity.

OBJECT AND SUMMARY OF THE INVENTION

Accordingly, it is the object of the present invention to overcome the above described problems of core deflection and thus uneven wall thicknesses and weld lines in the resulting molded plastic product, while providing a self-regulating gate valve assembly which eliminates the necessity for a complicated and expensive gate valve pin control system for opening and closing the gate valve.

By this invention, it has been found that the above object may be accomplished by providing a gate valve assembly, adapted for use in a plastic product injection molding apparatus having a mold cavity and a core therein for molding a hollow product of predetermined design, which includes generally tho following components.

A valve housing is provided which has passageways therein for receiving plastic molding compound under pressure from a source and includes a generally cylindrical gate of restricted dimensions adapted to communicate with the mold cavity for injecting a jet of the plastic molding compound under a predetermined pressure into the mold cavity to impinge upon an end of the mold core and flow around the mold core therein to fill the cavity.

A generally cylindrical valve pin is provided which has a cross-sectional diameter approximately as great as the dimensions of the gate, au end and a reduced diameter section adjacent the end. The valve pin is movably positioned within the valve housing for movement of the lower end into seating position with the gate for closing the gate and shutting-off the flow of the plastic molding compound through the gate into the mold cavity and out of seating position with the gate toward the mold cavity with the reduced diameter section positioned within the gate for allowing the flow of plastic molding compound through the gate in the mold cavity. Preferably, the reduced diameter section of the valve pin comprises a longitudinally-extending cut-out section around the circumference thereof which has a reduced cross-sectional diameter at the center thereof and progressively increases in cross-sectional diameter from the center thereof in both longitudinal directions to form a generally concave outside surface around the valve pin resulting in balanced flow around the valve pin by the plastic molding compound flowing therearound and into the mold cavity.

Devices, preferably in the form of a fluid-operated piston, are connected to the valve pin for being actuated to move the valve pin longitudinally toward the mold cavity to open the gate and hold the pin in the open position of the gate under predetermined forces.

With the above arrangement, the reduced diameter section and the end of the valve pin cooperate when the valve pin is in the open position of the gate so that the plastic molding compound will flow through the gate valve and around the reduced diameter section or, preferably, the concave cut-out section, and the end of the valve pin and into the mold cavity and around the mold core in a sheath-like flow configuration to produce balanced forces on the mold core to prevent deflection. The predetermined pressure of the plastic molding compound will produce forces on the end of the valve pin after filling the mold cavity which are greater than the predetermined forces holding the valve pin open to cause the valve pin to move longitudinally and close the gate in a self-regulating manner.

BRIEF DESCRIPTION OF THE DRAWINGS

While some of the objects and advantages of the invention have been stated above, other objects and advantages will become apparent in the detailed description of the preferred embodiment of this invention to follow, when taken in conjunction with the accompanying drawings, in which:

FIG. 2 is a partial cross-sectional view through a plastic product injection molding apparatus showing the bottom of the gate valve assembly of FIG. 1 mounted on the top of such apparatus for molding a plastic product;

FIG. 3 is a perspective view of a molded plastic product produced by the injection molding apparatus of FIG. 2;

FIG. 4 is an enlarged perspective view, partially in section, of the upper end of the injection molding apparatus and the lower end of the gate valve assembly, as shown in FIG. 2, with flow arrows indicating the flow of the plastic molding compound;

DETAILED DESCRIPTION OF PREFERRED EMBODIMENT OF THE INVENTION

Figure 1:
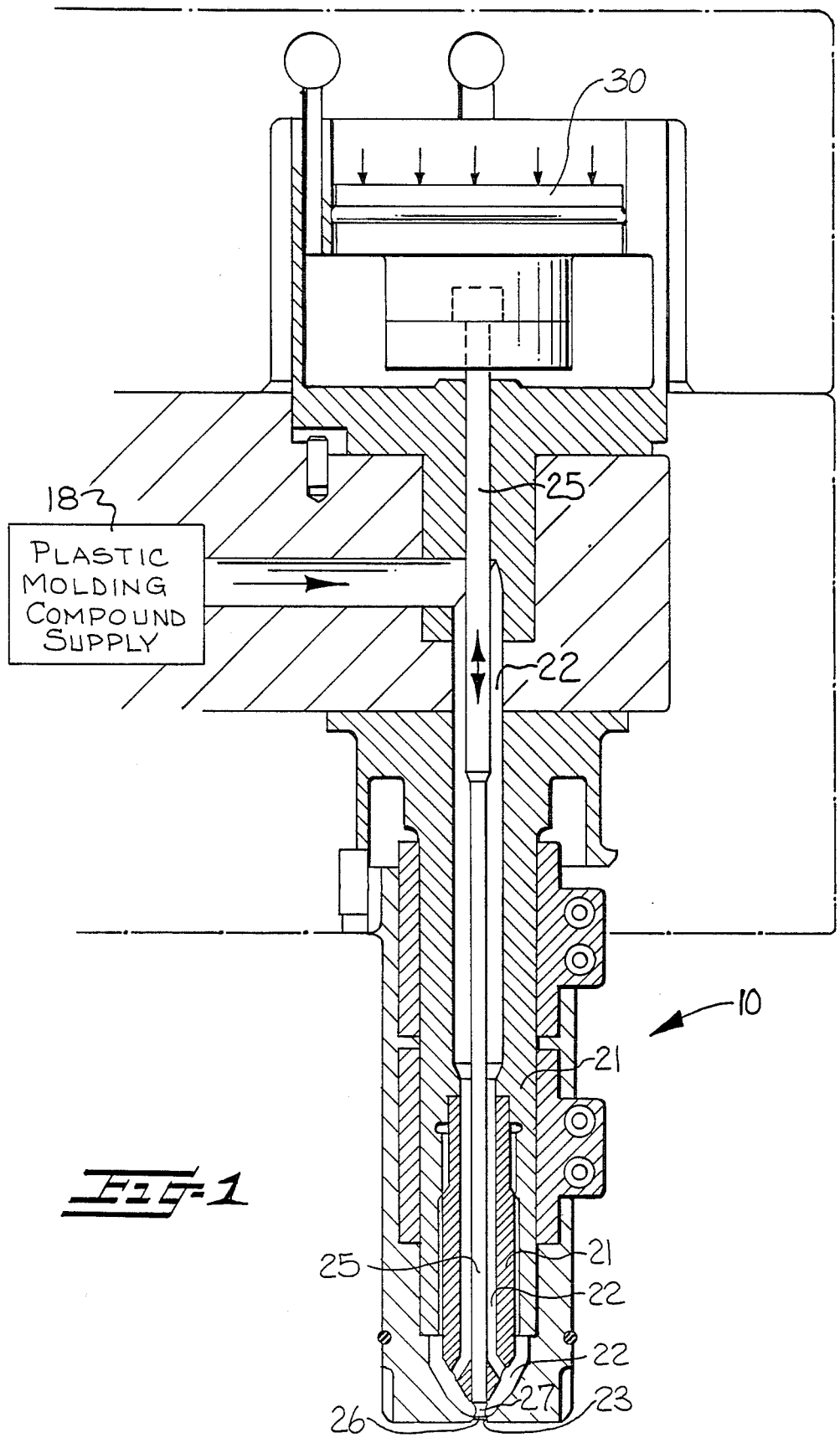
FIG. 1 is a partial sectional view taken through a gate valve assembly constructed in accordance with this invention and adapted to be mounted on top of a plastic product injection molding apparatus.

Referring now to the drawings, there is shown in FIG. 1 a partial sectional view taken through a gate valve assembly, generally indicated at 10, constructed in accordance with this invention and adapted to be mounted on top of a plastic product injection molding apparatus, generally indicated at 12 and a partial cross-section of which is shown in FIG. 2 with the gate valve assembly 10 mounted on the top thereof. It is to be understood that the particular gate valve assembly 10 and the plastic product injection molding apparatus 12 illustrated in the drawings and to be described hereinafter are preferred embodiments in accordance with this invention; however, other gate valve assemblies and plastic product molding apparatuses may be utilized incorporating the novel features of this invention.

The plastic product injection molding apparatus 12 includes a split mold housing 13, 14 defining therewithin a mold cavity 15 of a predetermined configuration, and a mold core 16 of predetermined configuration positioned and centered within the mold cavity 15 for molding a hollow plastic product of a predetermined design, generally indicated at P and shown particularly in FIG. 3. As illustrated in FIG. 3, the molded plastic product P may be a spout for a caulking cartridge. Inasmuch as these plastic product injection molding apparatuses are well known to those with ordinary skill in the art further details of the construction thereof for an understanding of the present invention are not necessary.

In accordance with this invention, the self-regulating gate valve assembly 10 is positioned at generally the top of the plastic product injection molding apparatus, as shown in FIG. 2, and between the mold cavity 15 and means for supplying plastic molding compound C under pressure, generally indicated at 18 and shown schematically in FIG. 1, for monitoring and controlling the flow of such plastic molding compound C. Such means for supplying plastic molding compound C under pressure in a molten state for molding the plastic product are well known in injection molding apparatus and have not been illustrated in detail herein. The self-regulating gate valve assembly 10 of this invention is characterized by a construction substantially eliminating core 16 deflection, as discussed above, and thus weld lines and uneven wall thicknesses in the resulting molded plastic product P, as discussed above.

The gate valve assembly 10 includes a composite valve housing, the component parts of which are generally indicated at 21 and may take any suitable form of well known valve housings presently commercially available. The valve housing includes passageways, collectively indicated at 22, for receiving the plastic molding compound C under pressure from the supply means 18 and including a generally cylindrical gate 23 of restricted dimensions at the bottom thereof which communicates with the top of the mold cavity 15 for injecting a jet of the flowing plastic molding compound C under a predetermined pressure into the mold cavity 15 to impinge upon the upper end of the mold core 16 and flow around the mold core 16 to fill the mold cavity 15, as shown generally in FIGS. 2 and 6 and as indicated by the flow arrows in FIG. 4, to ultimately form the molded plastic product P.

Figures 5, 6:
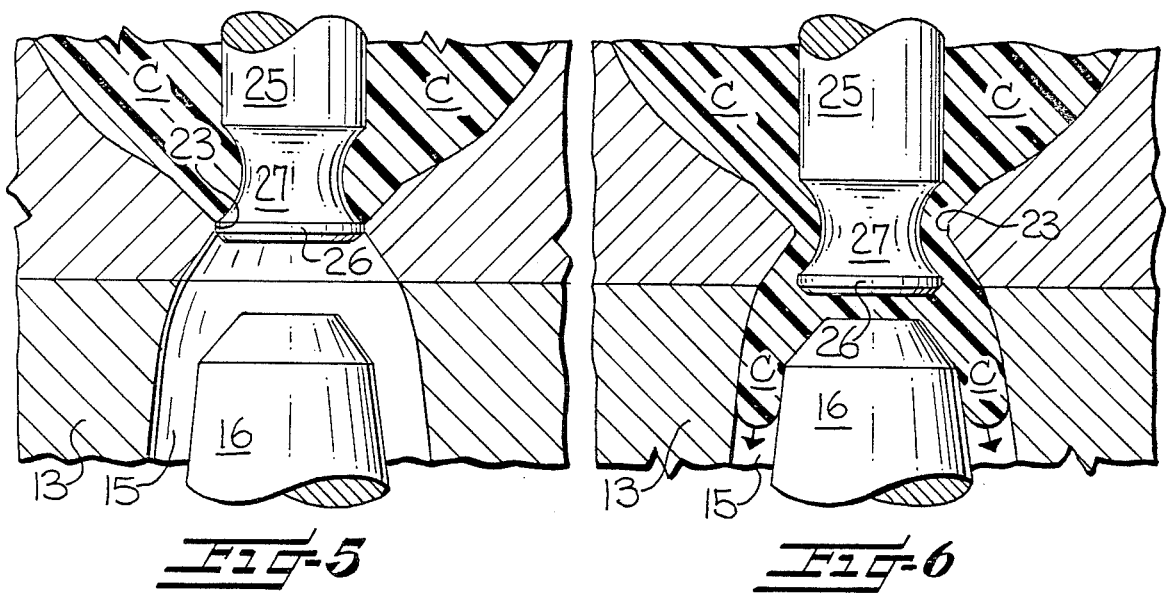
FIG. 5 is a vertical sectional view of the devices shown in FIG. 4 with the gate valve assembly in closed position.
FIG. 6 is a view, like FIG. 5, showing the gate valve assembly in open position and the plastic molding compound being injected into the mold cavity and around the mold core.

The gate valve assembly further includes a generally cylindrical valve pin 25 having a cross sectional diameter approximately as great as the dimensions of the gate 23 and a lower end 26 for being seated within the gate 23 to close such gate 23 and close the gate valve assembly 10, as shown in FIG. 5. The valve pin 25 is movably positioned within the valve housing 21 and within the passageways 22 in any suitable manner, such as shown in FIG. 1, for up and down movement to move the lower end 26 into and out of sealing position with the gate 23 for respectively opening and closing the gate 23 allowing and shutting-off the flow of plastic molding compound C through the gate 23 into the mold cavity 15, as shown respectively in FIGS. 6 and 5.

The valve pin 25 has a reduced diameter section 27 slightly above and adjacent to the lower end 26 for being positioned within the gate 23 when the gate is open, as shown in FIG. 6. The reduced diameter section 27 of the valve pin 25 is positioned above the gate 23 when the gate 23 is closed, as shown in FIG. 5. Preferably, the reduced diameter section 27 of the valve pin 25 comprises a longitudinally-extending, cut-out section around the circumference thereof having a reduced cross-sectional diameter at the center thereof and progressively increasing in cross-sectional diameter from the center thereof in both longitudinal directions to form a generally concave outside surface around the valve pin 25, as clearly shown in FIGS. 4-7, resulting in a uniform balanced flow around the valve pin 25 by the flowing plastic molding compound C.

The gate valve assembly 10 further includes means, preferably in the form of fluid-operated piston means 30, connected to the upper end of the valve pin 25 for being actuated, for example by a pressurized fluid flowing on one side thereof and impinging thereagainst as indicated by the arrows in FIG. 1, to move the valve pin 25 downwardly to open the gate 23 and to hold the pin 25 under a predetermined forces which can be regulated by regulating the pressure of the fluid in the piston means 30. The construction and operation of the specific piston means 3, as shown in FIG. 1, is conventional and may take any suitable form desired for being actuated to move the piston 30 downwardly and to hold the piston 30 downwardly under a predetermined pressure.

Figure 7:
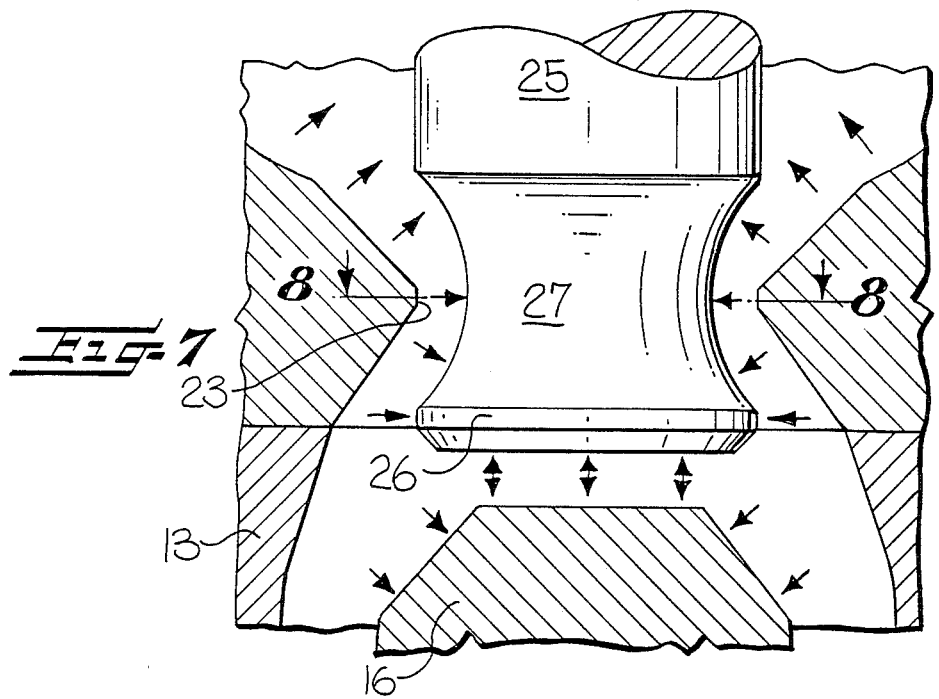
FIG. 7 is an enlarged view, somewhat like FIG. 6, showing schematically by arrow the forces produced by the plastic molding compound on the reduced diameter section and the lower end of the gate valve pin and on the upper end of the mold core.
Figure 8:
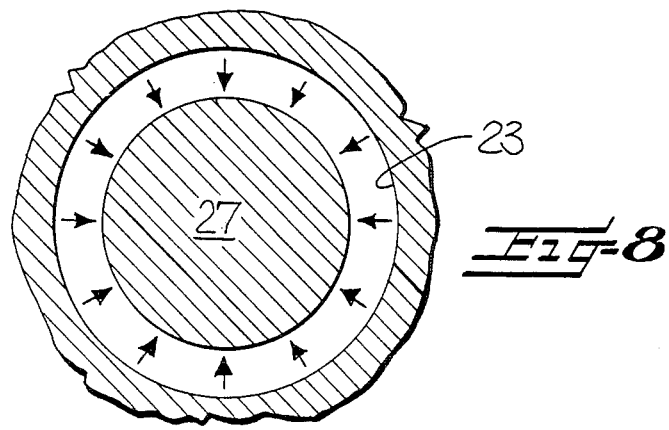
FIG. 8 is a sectional view, taken generally along the lines 8—8 of FIG. 7, which also schematically illustrates the forces of the plastic molding compound on the reduced diameter section of the gate valve pin.

With the above construction of the gate valve assembly 10, the reduced diameter section 27, preferably in the form of a cut-out section with a concave outer surface, and the lower end 26 of the valve pin 25 cooperate when the valve pin 25 is moved downwardly to open the gate 23 so that the plastic molding compound C will flow through the gate 23 and around be reduced diameter section 27 and the lower end 26 of the valve pin 25 and into the mold cavity 15 in a sheath-like flow configuration, as shown by the flow arrows in FIG. 4, and by the actual molding compound flow shown in FIG. 6, to produce balanced forces on the mold core 16, as shown schematically by the force arrows in FIG. 7, to prevent deflection of the core 16 out of alignment with the mold cavity 15 and the gate 23. After the mold cavity 15 has been filled by plastic molding compound C, the forces created by the predetermined pressure of such plastic molding compound C will act on the bottom of the lower end 26 of the valve pin 25, as indicated by the force arrows in FIG. 7, which are greater than the predetermined forces holding the valve pin open causing the valve pin 25 to move upwardly and close the gate 23 in a self-regulating manner.

Thus, the problems of core deflection resulting in uneven wall thicknesses and weld lines in the molded plastic product P, as discussed above, will be prevented by the sheath-like flow of the molding plastic compound C from the gate 23 into engagement with the upper end of the mold core 16 and the gate valve assembly 12 is self-regulating in that the valve pin 25 will automatically close upon filling of the mold cavity 15 with flowing molding compound C to eliminate the necessity for complicated mechanisms to close such gate valve assembly 12.

In the drawings and specification there has been set forth a preferred embodiment of this invention and although specific terms are employed, they are used in a generic and descriptive sense only and not for purposes of limitation, the scope of the invention being defined in the following claims.

What is claimed is:

1. A self-regulating gate valve assembly, adapted for use in a plastic product injection molding apparatus having a mold cavity and a mold core therein for molding a hollow product of predetermined design, said gate valve assembly having construction substantially eliminating mold core deflection during plastic molding compound flow in the injection molding apparatus and thus uneven wall thicknesses and weld lines in the molded plastic product, said gate valve assembly comprising:

a valve housing having passageways therein for receiving plastic molding compound under pressure from a source and including a generally cylindrical gate of restricted dimensions adapted to communicate with the mold cavity for injecting a jet of the plastic molding compound under a predetermined pressure into the mold cavity to impinge upon an end of the mold core and flow around the mold core therein to fill the cavity;

a generally cylindrical valve pin having a cross-sectional diameter approximately as great as the dimensions of said gate, an end and a reduced diameter section adjacent said end, said valve pin being movably positioned within said valve housing for movement of said end into seating position with said gate for closing said gate and shutting-off the flow of the plastic molding compound through said gate into the mold cavity and out of seating position with said gate toward the mold cavity with said reduced diameter section positioned within said gate for allowing the low of the plastic molding compound though said gate into the mold cavity, said reduced diameter section of said valve pin comprises a longitudinally-extending cut-out section around the circumference thereof having a reduced cross-sectional diameter at the center thereof and progressively increasing in cross-sectional diameter from the center thereof in both longitudinal directions to form a generally concave outside surface around said valve pin resulting in a uniform balanced flow around said valve pin by the plastic molding compound flowing therearound and into the mold cavity; and means connected to said valve pin for being actuated to move said valve pin longitudinally toward the mold cavity to open said gate and hold said pin in the position of said gate under predetermined forces;

whereby, said reduced diameter section and said end of said valve pin cooperate when said valve pin is in the open position of said gate so that the plastic molding compound will flow through said gate and around said reduced diameter section and said end of said valve pin and into the mold cavity and around the mold core in a sheath-like flow configuration to produce balanced forces on the mold core to prevent deflection, and, wherein, the predetermined pressure of the plastic molding compound will produce forces on the end of said valve pin after filling the mold cavity greater than the predetermined forces holding said valve pin open to cause said valve pin to move longitudinally and close said gate in a self-regulating manner.

2. A self-regulating gate valve assembly, as set forth in claim 1, in which said means for moving said valve pin longitudinally and holding said valve pin in the open position of said gate under predetermined forces comprises fluid-operated piston means.

3. In a plastic product injection molding apparatus having a mold housing defining a cavity therewithin of a predetermined configuration, a mold core of predetermined configuration positioned within said cavity and cooperating with said cavity for molding a hollow plastic product of predetermined design, and means for supplying plastic molding compound under pressure from a source, a self-regulating gate valve assembly positioned between said means for supplying plastic molding compound under pressure and said mold cavity for controlling and monitoring the flow of plastic molding compound, said gate valve assembly having a construction substantially eliminating mold core deflection during plastic molding compound flow into said mold core and thus eliminating uneven wall thicknesses and weld lines in the resulting molded plastic product, said gate valve assembly comprising a valve housing having passageways therein for receiving the plastic molding compound under pressure from said supply means and including a generally cylindrical gate of restricted dimensions at the bottom thereon communicating with the top of said mold cavity for injecting a jet of the plastic molding compound under predetermined pressure into said mold cavity to impinge upon the upper end of said mold core and low around said mold core therein to fill said cavity, a generally cylindrical valve pin having a cross-sectional diameter approximately at least as great as the dimensions of said gate, a lower end and a reduced diameter section slightly above said lower end, said valve pin being movably positioned within said valve housing from movement of said lower end into seating position with said gate for closing said gate and shutting-off the flow of plastic molding compound through said gate into said mold cavity and out of seating position with said gate toward the mold cavity with said reduced diameter section positioned within said gate for allowing the flow of plastic molding compound through said gate into the mold cavity, said reduced diameter section of said valve pin comprises a longitudinally-extending cut-out section around the circumference thereof having a reduced cross-sectional diameter at the center thereof and progressively increasing in cross-sectional diameter from the center thereof in both longitudinal directions to form a generally concave outside surface around said valve pin resulting in a uniform balanced flow around said valve pin by the plastic molding compound flowing therearound and into the mold cavity; and means connected to the upper end of said valve pin for being actuated to move said valve pin downwardly to open said gage and hold said pin in the downward position under predetermined forces;

whereby, said reduced diameter section and said lower end of said valve pin cooperate when said valve pin is moved downwardly to open said gate so that the plastic molding compound will flow through said gate and around said reduced diameter section and said lower end of said valve pin and into said mold cavity and around said mold core in a sheath-like flow configuration to produce balanced forces on said mold core to prevent deflection, and, wherein, the predetermined pressure of the plastic molding compound will produce forces on the bottom of said lower end of said valve pin after filling said mold cavity greater than the predetermined forces holding said valve pin open to cause said valve pin to move upwardly and close said gate in a self-regulating manner.

4. In a plastic product injection molding apparatus having a mold housing defining a cavity therewithin of a predetermined configuration, a mold core, of predetermined configuration positioned within said cavity and cooperating with said cavity for molding a hollow plastic product of predetermined design, and means for supplying plastic molding compound under pressure from a source, a self-regulating gate valve assembly positioned between said means for supplying plastic molding compound under pressure and said mold cavity for controlling and monitoring the flow of plastic molding compound, said gate valve assembly having a construction substantially eliminating mold core deflection during plastic molding compound flow into said mold core and thus, uneven wall thicknesses and weld lines in the resulting molded plastic product, said gate valve assembly comprising a valve housing having passageways therein for receiving the plastic molding compound under pressure from a source and including a generally cylindrical gate of restricted dimensions at the bottom thereof communicating with the top of said mold cavity for injecting a jet of the plastic molding compound under a predetermined pressure into said mold cavity to impinge upon the upper end of said mold core and flow around said mold core therein to fill said cavity, a generally cylindrical valve pin having a cross-sectional diameter approximately as great as the dimensions of said gate, a lower end and a reduced diameter section adjacent said lower end, said valve pin being movably positioned within said valve housing for movement of said lower end into seating position with said gate for closing said gate and shutting-off the flow of plastic molding compound through said gate into said mold cavity and out of seating position with said gate toward said mold cavity with said reduced diameter section positioned within said gate for allowing the flow of plastic molding compound through said gate into said mold cavity, said reduced diameter section comprising a longitudinally-extending cut-out section around the circumference of said valve pin and having a reduced cross-sectional diameter at the center thereof and progressively increasing in cross-sectional diameter from the center thereof in both longitudinal directions to form a generally concave outside surface around said valve pin resulting in a uniform balanced flow around said valve pin by the plastic molding compound flowing therearound and into the mold cavity, and fluid-operated piston means connected to the upper end of said valve pin for being actuated to move said valve pin downwardly to open said gate and hold said pin in the downward position under predetermined forces, whereby, said concave cut-out section and said lower end of said valve pin cooperate when said valve pin is moved downwardly to open said gate so that the plastic molding compound will flow through said gate when open and around said cut-out section and said lower end of said valve pin and into said mold cavity and around said mold core in a sheath-like flow configuration to produce balanced forces on said mold core to prevent deflection, and, wherein, the predetermined pressure of the plastic molding compound will produce forces on the bottom of said lower end of said valve pin after filling said mold cavity greater than the predetermined forces holding said valve pin open to cause said valve pin to move upwardly and close said gate in a self-regulating manner.

* * * * *